United States Patent [19]

Lowe

[11] Patent Number: 5,283,601
[45] Date of Patent: Feb. 1, 1994

[54] PROJECTOR AND PROCESS FOR CREATING A NIGHT-SKY ILLUSION

[75] Inventor: J. Denny Lowe, Bellevue, Wash.

[73] Assignee: Stellar Ventures, Inc., Kirkland, Wash.

[21] Appl. No.: 844,155

[22] Filed: Mar. 2, 1992

[51] Int. Cl.⁵ .................... G03B 21/00; G09B 27/00
[52] U.S. Cl. ................................ 353/62; 434/286
[58] Field of Search ............. 353/62, 80, 122, 97, 353/DIG. 3, DIG. 4, DIG. 5, 46, 28, 22, 23, 95, 96, 24, 119, 120, 76; 434/286, 285, 284

[56] References Cited

U.S. PATENT DOCUMENTS

| | | | |
|---|---|---|---|
| 1,828,057 | 10/1931 | Lunt et al. | 434/286 |
| 2,669,156 | 2/1954 | Fitzgerald | 353/22 |
| 3,473,428 | 10/1969 | Phillips | 353/62 |
| 4,178,701 | 12/1979 | Sadler | 434/286 |
| 4,579,534 | 4/1992 | Lipman et al. | 434/286 |
| 4,955,714 | 9/1990 | Stotler et al. | 353/62 |

FOREIGN PATENT DOCUMENTS

8606531 11/1986 World Int. Prop. O. .......... 434/285

Primary Examiner—Thomas B. Will
Assistant Examiner—William C. Dowling
Attorney, Agent, or Firm—H. Albert Richardson

[57] ABSTRACT

A projector for creating a night-sky illusion on a planar surface such as a ceiling or a wall. The projector includes a base having two pairs of opposing walls and a shelf assembly adapted to be mounted in the base including a light bulb, a battery connected to the bulb, and a switch. It also includes a top adapted to be slidably mounted on the base and a transparency extending across an opening formed in the lid. The transparency is generally opaque, but includes a array of transparent dots fixed in predetermined positions. The disclosed method involves using the projector to produce an array of light spots resembling the night sky on a surface, applying luminescent paint to the spots and then exposing the painted spots to light energy, causing the paint to glow.

5 Claims, 2 Drawing Sheets

UP
DOWN

PROJECTOR AND PROCESS FOR CREATING A NIGHT-SKY ILLUSION

BACKGROUND OF THE INVENTION

This invention generally relates to optical equipment and more particularly to a projector for producing a night sky illusion on a planar surface such as the interior ceiling of a room.

From the beginning, humans have regarded the heavens with feelings of wonder, fascination, awe and sometimes fear. Major heavenly bodies were regarded as gods by early peoples and clusters of stars were imagined to resemble mythical creatures and persons that paraded across the nighttime sky. Out of people's need to understand and rationalize what could be seen in the heavens was born what is possibly the oldest of sciences, astronomy, and a countless number of fables. Viewing of the nighttime sky remains a pastime enjoyed by young and old alike. Unfortunately due to adverse weather conditions and the realities of urban living, such an experience is becoming increasingly rare for most people.

A popular substitute for actual viewing of the stars is a planetarium. By permitting indoor viewing of simulated portions of the night sky, a planetarium provides a year round source of astronomical education and entertainment. Typically a planetarium will have a spherically shaped ceiling and a projector mounted at the approximate center of the sphere. The projector will include a small rotatably mounted sphere and an intense light source mounted within the sphere at its center. The surface of this sphere is opaque and includes a large number of tiny holes. The holes are positioned so that when the projector is illuminated the light transmitted through the holes in the sphere will form light patterns on the ceiling resembling star, planets and constellations as they would be viewed from the earth's surface. By rotating this sphere, the apparent movement of these bodies due to rotation of the earth can be simulated. Also by properly orienting this sphere, portions of the heavens seen at different times during the night and different seasons of the year can be viewed. A visit to a planetarium is a unique experience, and many people have expressed a desire to have a planetarium in their own homes. Unfortunately, because of the expense and structural complexity involved in building a planetarium even on a small scale, this would not be possible for most people.

Accordingly, it is an object of this invention to provide a projector for creating a night sky effect on a ceiling which is relatively simple, inexpensive and practical for residential use.

It is another object of this invention to provide for such a projector in which the night sky image is created using a substantially planar transparency, thus eliminating the more complex spherical lens assemblies used in planetariums.

It is a further object of this invention to provide for a process for creating a night sky image on a ceiling using luminescent paint, thus eliminating the need for continuing use of the projector.

SUMMARY OF THE INVENTION

This invention can be broadly summarized as providing for a projector for creating a night sky image on a substantially planar surface such as a ceiling or a wall of a room. The projector includes a base, a top adjustably mounted on the base and including a substantially planar transparency, and a light source mounted in the base at a predetermined position with respect to the transparency.

In accordance with a more detailed aspect of the invention, the light source includes a high intensity light and a battery mounted on a shelf adapted to be positioned against a side and two adjoining ends of the base. When so positioned the light will be located substantially beneath the geometric center of the transparency.

The invention can also be summarized as providing for a process for producing a night sky illusion on a ceiling, a wall or other substantially planar surface. The process includes the steps of using the projector to produce a plurality of light spots representing stars, planets, and constellations, and then applying luminescent paint to the spots.

DETAILED DESCRIPTION OF PREFERRED EMBODIMENTS

The novel features believed to be characteristic of this invention are set forth in the appended claims. The invention itself however may be best understood in its various objects and advantages best appreciated by reference to the detailed description below in connection with the accompanying drawings.

Figure 1:
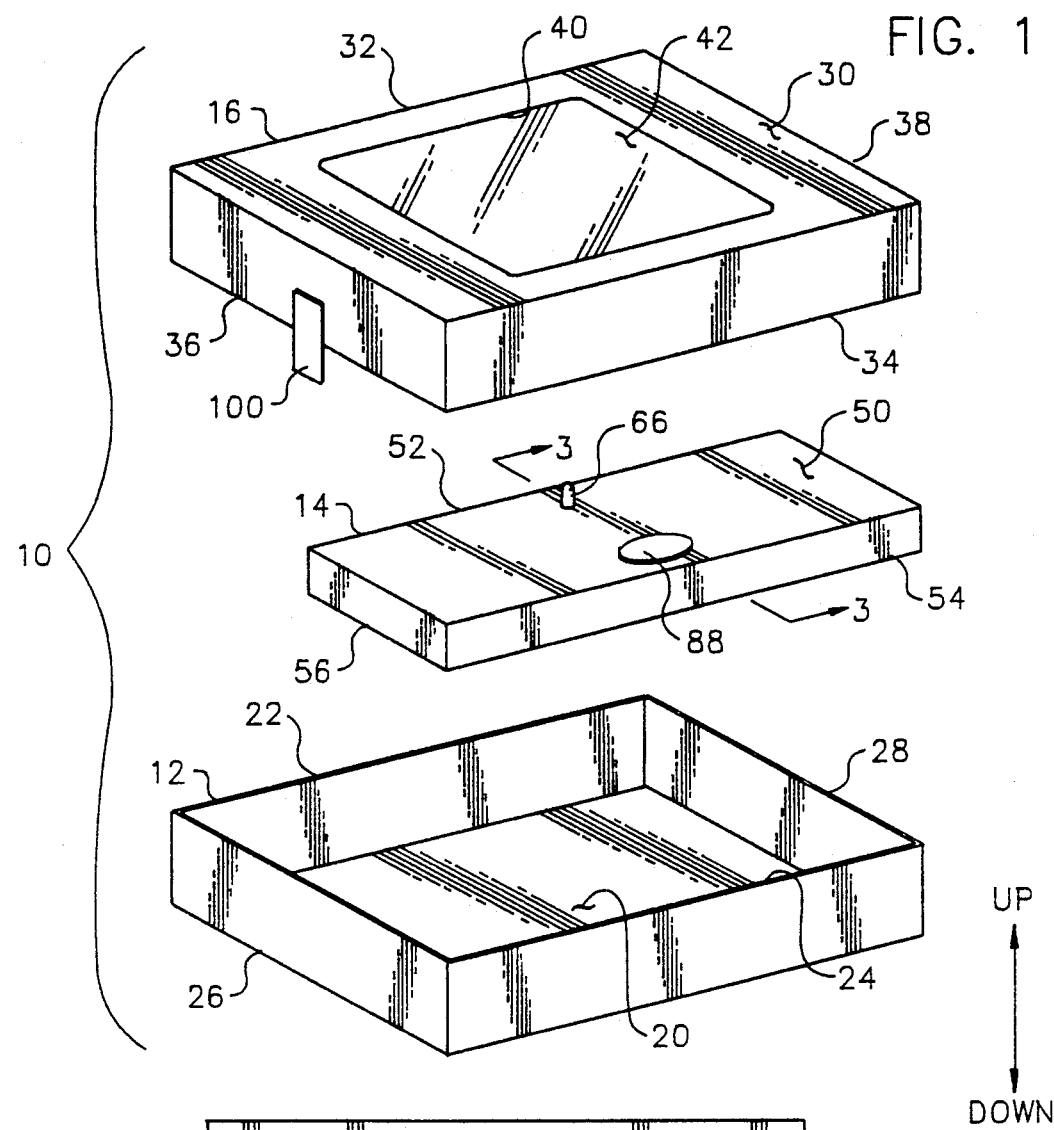
FIG. 1 is a perspective view of a projector constructed in accordance with the teachings of the present invention.

FIG. 1 of those drawings illustrates a projector constructed in accordance with the teachings of the present invention and generally designated by the number 10. The projector includes a base 12, a shelf 14 and a top 16. Each of these components is preferably formed from cardboard cut and folded in a manner well known in the art. The base includes a rectangular bottom 20, opposing sides 22 and 24, and opposing ends 26 and 28. Top 16 has an upper surface 30, opposing sides 32 and 34, and opposing ends 36 and 38. A substantially rectangular opening 40 is cut in upper surface 30.

A significant aspect of this invention is transparency 42 which is preferably mounted to the underside of upper surface 30 with an adhesive. The portion of the transparency visible through opening 40 is largely opaque but includes a number of transparent dots positioned in predetermined locations. The dots are sized and spaced such that when a source of a light is positioned directly beneath the geometric center of opening 40 and the transparency is oriented such that it lies in a plane parallel and a few feet from a viewing surface such as a ceiling or a wall, a pattern of dots of light resembling the stars, planets, and constellations found in a certain portion of the celestial sphere will be displayed on the surface. By appropriately positioning and sizing the transparent dots on the transparency, distortions which would otherwise result from the fact that the transparency and the viewing surface are planar rather than spherical can be eliminated. Such positioning can be accomplished by a variety of means well known to those of ordinary skill in the map making arts.

Figure 2:
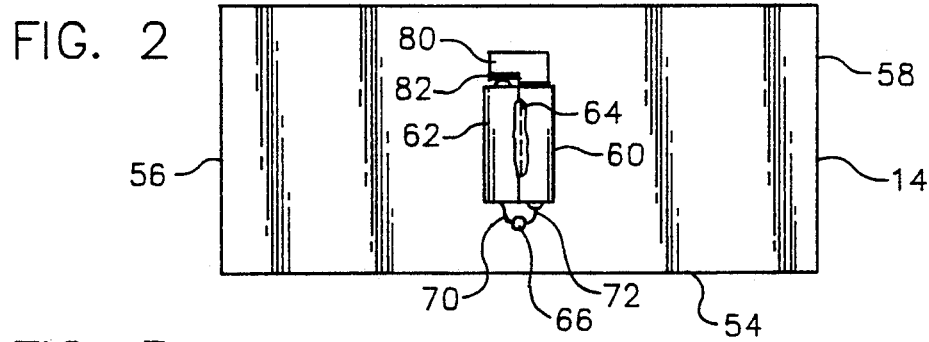
FIG. 2 is a bottom view of the shelf of FIG. 1.
Figure 3:
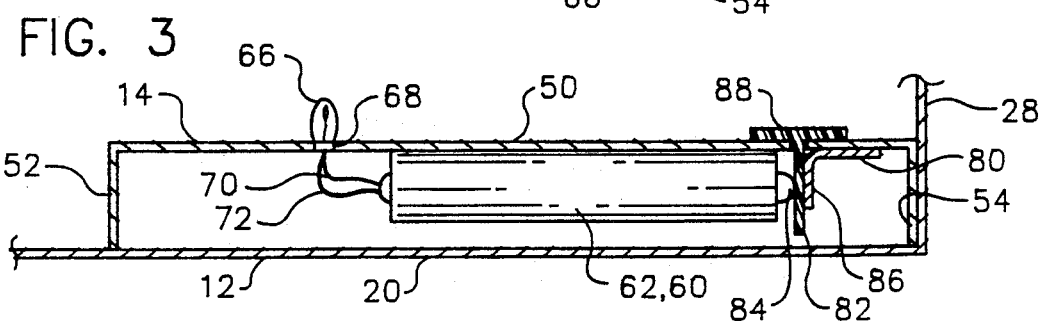
FIG. 3 is a partial sectional view taken at 3—3 FIG. 1.
Figure 4:
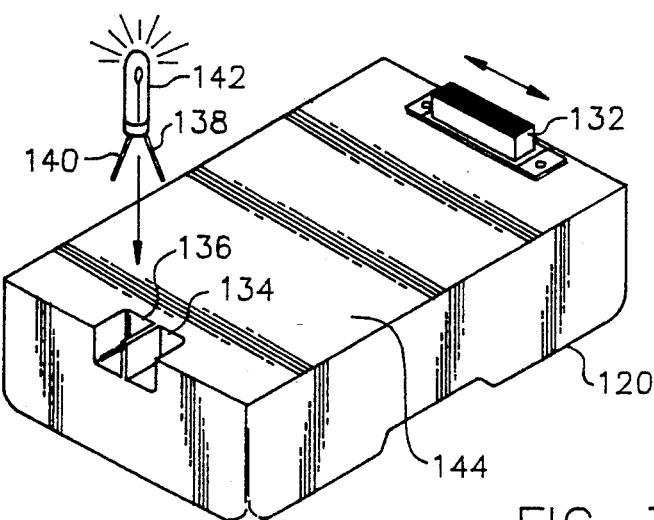
FIG. 4 is a perspective view of a unitized light source for use in a second embodiment of the invention.
Figure 5:
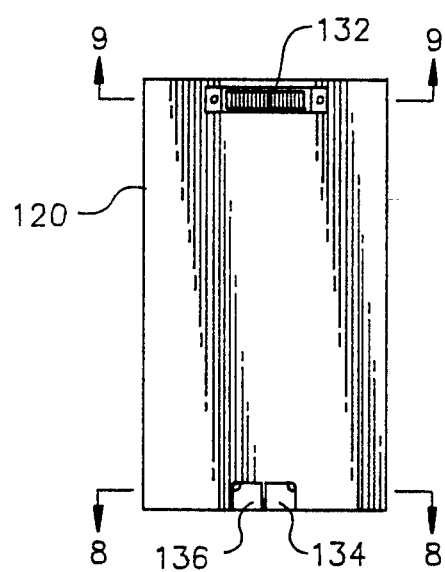
FIGS. 5, 6 and 7 are top, side and bottom views respectively of the light source of FIG. 4.
Figure 6:
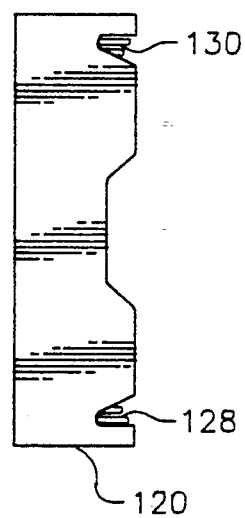

Shelf 14 functions as a support for the light source and automatically positions it with respect to transparency 42. The shelf includes an upper surface 50, opposing sides 52 and 54 and opposing ends 56 and 58. Referring to FIGS. 2 and 3 it can be seen that the light source preferably includes a pair of AA batteries 60 and 62 joined together and mounted to the underside of upper surface 50 with adhesive 64. High intensity light bulb 66 is positioned in circular opening 68 in upper surface 50 and leads 70 and 72 from the bulb are soldered to the terminals of the batteries as shown. Also mounted to the underside of surface 50 with an adhesive is brass contact strip 80 which acts to connect the end terminals of the batteries. In order to maintain the light source in an "off" mode until operation of the projector is desired, plastic insulating strip 82 is positioned between adjoining terminal 84 and battery 62 and lower portion 86 of the contact strip. The insulator strip passes through a slot in upper surface 50 and is attached firmly to adhesive backed disk 88.

During assembly of the projector, shelf 14 is inserted in the base so that it rests against bottom 20 and side 54 is in contact with side 24. An adhesive is used to bond side 26, end 26 and end 28 of the base to sides 54, end 56 and end 58, respectively of the shelf. Light bulb 66 is positioned in upper surface 50 of the shelf such that when the shelf is placed in this position within the base the bulb will be centered in the base. Further, top section 16 is dimensioned such that its sides and ends will snugly but slideably fit over the corresponding sides and ends of the base.

In operation, the projector is placed approximately two feet above the floor in the center of a room having a standard eight foot ceiling height. Next the projector is activated by lifting top 16 from the base and then removing adhesive disk 88 from the shelf, thus removing insulator strip 82 from between contact strip 80 and battery terminal 84. After top 16 is repositioned on the base the room is darkened as completely as possible. Next, in order to adjust for the dimensions of the room and ceiling height, the projector is focused by moving the top vertically with respect to the base until the desired stellar pattern is achieved. The focus is fixed by attaching adhesive strips 100 and 102 (not shown) to ends 36 and 38 of the top and then pressing the strips into contact with ends 26 and 28, respectively, of the base.

Then, using cylindrical glass rods of various diameters as applicators, a small amount of a neutral colored luminescent paint is applied to each dot of light displayed on the ceiling. After all projected dots have been painted a random array of small paint dots is applied to the ceiling to simulate background stars. The projector will continue to operate for a number of hours providing quite adequate time to complete the project. Once the paint has dried the stellar array can be viewed by exposing the painted dots to visible or ultraviolet light and then darkening the room.

Figure 7:
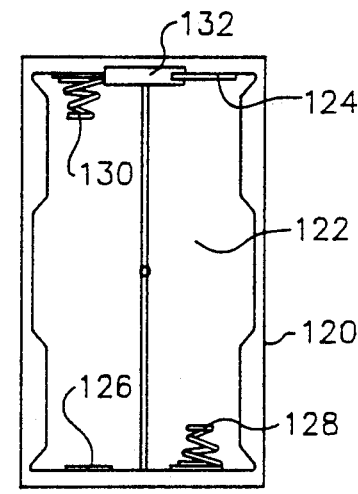
Figure 8:
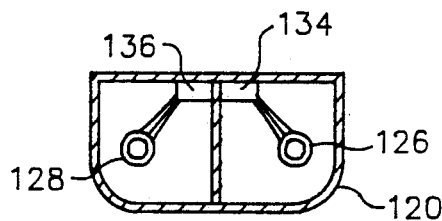
FIGS. 8 and 9 are sectional views taken at 8—8 and 9—9 of FIG. 5 respectively.
Figure 9:
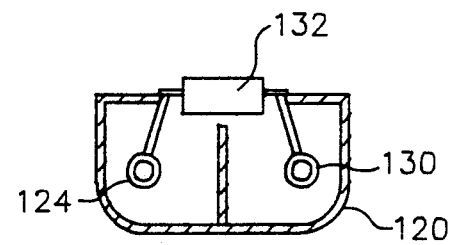

FIGS. 5 through 9 illustrate a unitized light source which can be used to significantly reduce the assembly time of the projector. It includes a one piece case 120 which has a recessed portion 122 which is sized to hold a pair of AA batteries. As shown in FIG. 7 the batteries are retained against contacts 124 and 126 by contact springs 128 and 130 respectively. Contacts 124 and 130 are interconnected by off-on switch 132 mounted in the case. Contacts 126 and 128 are electrically interconnected with sockets 134 and 136 respectively. Leads 138 and 140 of high intensity bulb 142 are inserted in sockets 134 and 136 respectively. The assembled case is then installed in the base by applying adhesive to surface 144 of the case and gluing it to the underside of upper surface 50 of shelf 14. The case is properly positioned on the shelf by inserting bulb 142 in opening 68 and by inserting switch 132 through an appropriately positioned rectangular opening cut in upper surface 50. With this embodiment the light source may be turned off and on as desired by the user.

Thus it can be seen that the present invention provides for a projector for creating a night sky illusion which incorporates many novel features and offers significant advantages over the prior art. Although only two embodiments of this invention have been illustrated and described, it is to be understood that obvious modifications can be made in it without departing from the true scope and spirit of the invention.

I claim:

1. A projector for creating a night sky illusion on a planar surface comprising:
    a base having an adjoining side and end;
    a shelf adapted to be mounted in the base adjoining the side and the end of the base;
    a light source mounted in a predetermined location on the shelf, the light source including a high intensity light bulb, a battery, and means for electrically connecting the bulb and the battery;
    a strip of insulating material for interrupting the electrical connection between the light bulb and the battery; and
    a top slidably mounted on the base and including an opening and a planar transparency mounted in the opening, permitting translation of the transparency with respect to the base so as to focus the projector.

2. The projector of claim 1 further including a contact strip and wherein the insulating strip is insertable between the contact strip and the battery.

3. A projector for creating a night sky illusion on a planar surface comprising:
    a base having an adjoining side and end;
    a shelf adapted to be mounted in the base adjoining the side and the end of the base;
    a light source mounted in a predetermined location on the shelf;
    a top slidably mounted on the base and including an opening and a planar transparency mounted in the opening, permitting translation of the transparency with respect to the base so as to focus the projector; and
    adhesive means for fixing the top in a selected focal position with respect to the base.

4. The projector of claim 2 wherein the adhesive means includes an adhesive strip for securing the base to the top.

5. A projector for creating a night sky illusion on a planar surface comprising:
    a base having a side and a pair of opposing ends each adjoining the side;
    a shelf mounted on the base adjoining the side and opposing ends;
    a light source mounted in a predetermined location on the shelf, the light source including a high intensity light bulb, a battery, a removable insulator for disconnecting the bulb and the battery;

a top adapted to be slidably mounted on the base and including an opening and a planar transparency mounted in the opening permitting translation of the transparency with respect to the base so as to focus the projector; and adhesive means for fixing the top in a selected focal position with respect to the base.

* * * * *